(12) United States Patent
Davis et al.

(10) Patent No.: US 8,291,589 B2
(45) Date of Patent: Oct. 23, 2012

(54) METHOD FOR ESTABLISHING A LOCATION OF AN ELEVATED STRESS REGION

(75) Inventors: Ephraim C. Davis, North Richland Hills, TX (US); Christopher J. Bischof, Southlake, TX (US)

(73) Assignee: United Technologies Corporation, Hartford, CT (US)

( * ) Notice: Subject to any disclaimer, the term of this patent is extended or adjusted under 35 U.S.C. 154(b) by 1690 days.

(21) Appl. No.: 11/835,452

(22) Filed: Aug. 8, 2007

(65) Prior Publication Data

US 2009/0038151 A1 Feb. 12, 2009

(51) Int. Cl.
*B23P 6/00* (2006.01)
*G01B 5/30* (2006.01)
*G01L 25/00* (2006.01)

(52) U.S. Cl. .............. 29/889.1; 29/402.01; 29/402.05; 29/407.05; 73/760; 73/799; 427/8; 702/113; 703/7

(58) Field of Classification Search ............... 29/889.1, 29/889.7, 402.01, 402.09, 402.18, 407.01, 29/407.05; 73/760, 762, 794, 799, 804, 847; 703/7, 113; 427/8–10
See application file for complete search history.

(56) References Cited

U.S. PATENT DOCUMENTS

| 3,887,987 | A | * | 6/1975 | Salt .............................. 29/407.05 |
| 4,234,397 | A |   | 11/1980 | Torrey |
| 5,115,136 | A | * | 5/1992 | Tomasch .................... 250/461.1 |
| 5,430,376 | A | * | 7/1995 | Viertl .............................. 324/227 |
| 5,523,170 | A |   | 6/1996 | Budinger |
| 6,072,568 | A | * | 6/2000 | Paton et al. ..................... 356/32 |
| 6,095,755 | A |   | 8/2000 | Houston |
| 6,203,847 | B1 | * | 3/2001 | Conner et al. ................ 427/142 |
| 6,270,318 | B1 |   | 8/2001 | Shah |
| 6,327,030 | B1 | * | 12/2001 | Ifju et al. ......................... 356/32 |
| 6,435,826 | B1 |   | 8/2002 | Allen |
| 6,756,908 | B2 |   | 6/2004 | Gass |
| 7,762,534 | B2 | * | 7/2010 | Ouellette et al. ................ 269/32 |
| 2005/0252304 | A1 | * | 11/2005 | Woodward et al. ............. 73/794 |
| 2006/0025936 | A1 |   | 2/2006 | Plotts |
| 2007/0069720 | A1 |   | 3/2007 | Goldfine |
| 2007/0157447 | A1 | * | 7/2007 | Prevey ....................... 29/402.01 |
| 2009/0116533 | A1 | * | 5/2009 | O'Connell et al. ............... 374/5 |

FOREIGN PATENT DOCUMENTS

EP 1647674 8/2007

* cited by examiner

*Primary Examiner* — Alexander P Taousakis

(74) *Attorney, Agent, or Firm* — Carlson, Gaskey & Olds, P.C.

(57) ABSTRACT

A method for use in repairing gas turbine engine components includes applying a stress to a first gas turbine engine component to cause surface cracking on the first gas turbine engine component and establishing a location of an elevated stress region of a second gas turbine engine component based upon the location of the surface cracking on the first gas turbine engine component.

10 Claims, 2 Drawing Sheets

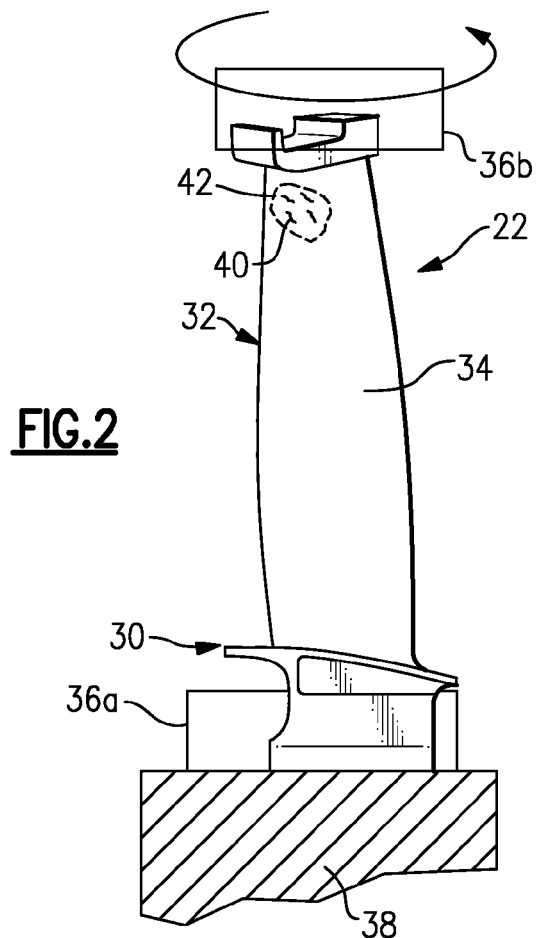
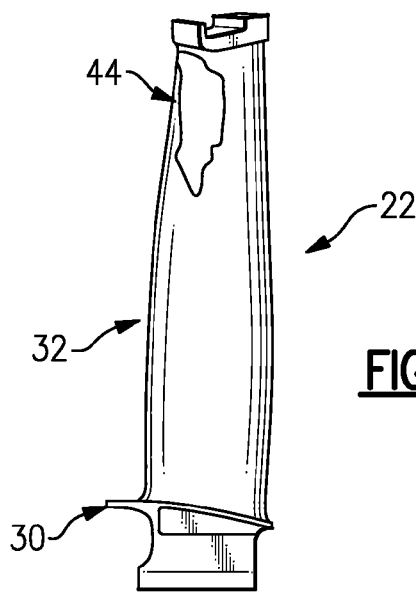
FIG.2
FIG.3

METHOD FOR ESTABLISHING A LOCATION OF AN ELEVATED STRESS REGION

This invention was made for government support under Contract No. F33657-99-D-2051 awarded by the United States Air Force. The government therefore has certain rights in this invention.

BACKGROUND OF THE INVENTION

This disclosure relates to repairing gas turbine engine components and, more particularly, to determining a location of an elevated stress region of a gas turbine engine component.

Gas turbine engine components, such as turbine blades, turbine vanes, compressor blades, compressor vanes, or other components typically operate in a relatively high stress and high temperature environment. The stresses and temperature may result in damage to the component from corrosion, erosion, deformation, or the like. Depending on the type and severity of the damage, the components may be repaired and reused.

The type of repair process depends on the type of damage. For example, relatively elevated stresses and temperatures within the engine may cause deformation of a blade, vane, or other component. For a blade that is effectively cantilevered from one end, the thermal and mechanical loads may result in a twisting deformation of the blade about its axis. The blade may be restored to near its original shape by twisting the blade in the opposite direction that caused the deformation. Other stresses may cause bending or other types of deformation.

Typically, after a repair process, one or more representative components are metallurgically analyzed to determine whether the stresses applied during the repair process damaged the component. For example, if the stress exceeds the yield strength of the component, cracks may form. A typical metallurgical analysis requires that the representative component be sectioned into a relatively large number of pieces. The pieces are then analyzed through known metallurgical methods for cracking or other damage.

To reduce the number of sections that are required, it is desirable to predict a location of a region of highest stress on the component using computer analysis and then sectioning only that region. This would provide analysis of the region of the component that is most vulnerable to cracking. However, one possible drawback of using computer analysis is that it is based on simulation, modeling, and experimental data that may deviate from actual conditions and lead to an inaccurate prediction of the location of the highest stress region.

Additionally, the computer analysis may be used to determine a maximum amount of stress that can be applied to a component during a repair process without causing cracking. However, since the computer analysis results can deviate from actual conditions that cause cracking, the stress used in the repair process may not be reliable for avoiding cracking.

Accordingly, there is a need for a method to verify that a predicted location of a high stress region on a gas turbine engine component is accurate and to accurately determine a maximum amount of stress that can be used in the repair process without causing cracking.

SUMMARY OF THE INVENTION

An example method for use in repairing a gas turbine engine component includes applying a stress to a first gas turbine engine component to cause surface cracking on the first gas turbine engine component. A location of an elevated stress region of a second gas turbine engine component is established based upon the location of the surface cracking on the first gas turbine engine component.

In another aspect, the method includes establishing a predicted location of an elevated stress region on a gas turbine engine component and applying a stress to the gas turbine engine component to determine a location of an actual location of the elevated stress region. The predicted location and the actual location are compared to verify the accuracy of the predicted location.

In another aspect, the method includes determining a magnitude of a first stress that causes surface cracking of a first gas turbine engine component and establishing a maximum magnitude of a second stress that is applied in a repair process to a second gas turbine engine component based upon the magnitude of a first stress.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 2 illustrates an example turbine blade of the gas turbine engine.

FIG. 3 illustrates an example predicted location of an elevated stress region of an example turbine blade.

DETAILED DESCRIPTION OF THE PREFERRED EMBODIMENT

Figure 1:
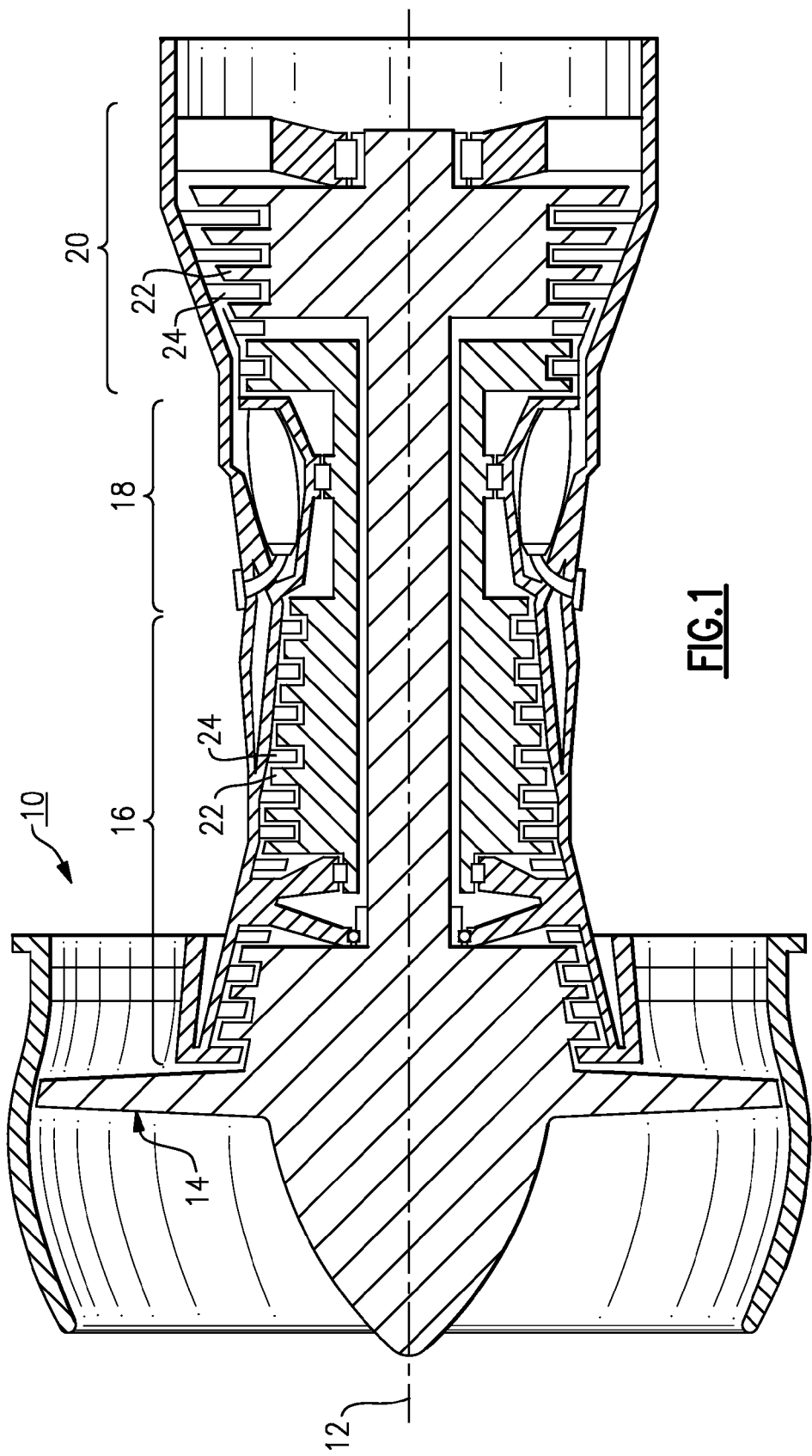
FIG. 1 illustrates an example gas turbine engine.

FIG. 1 illustrates selected portions of an example gas turbine engine 10, such as a gas turbine engine 10 used for propulsion. In this example, the turbine engine 10 is circumferentially disposed about an engine centerline 12. The turbine engine 10 includes a fan 14, a compressor section 16, a combustion section 18, and a turbine section 20. The combustion section 18 and the turbine section 20 include corresponding blades 22 and vanes 24. As is known, air compressed in the compressor section 16 is mixed with fuel and burned in the combustion section 18 to produce hot gasses that are expanded in the turbine section 20. FIG. 1 is a somewhat schematic presentation for illustrative purposes only and is not a limitation on the disclosed examples. Additionally, there are various types of gas turbine engines, many of which could benefit from the examples disclosed herein and are not limited to the designs shown.

FIG. 2 illustrates an example of one of the blades 22 from the turbine section 20 of the gas turbine engine 10. In this example, the blade 22 includes a platform section 30 and an airfoil section 32 that extends outwards from the platform section 30.

The blade 22 is formed from a nickel alloy that is generally resistant to elevated temperatures and maintains a desired degree of strength at the elevated temperatures, for example. The blade 22 is also coated with a protective coating 34 that protects the blade 22 from corrosion, erosion, and the like. In one example, the protective coating 34 includes aluminum, such as an aluminide coating, that is at least partially diffused into the nickel alloy of the blade 22. In one example, the protective coating 34 is MCrAlY, where the M includes at least one of nickel, cobalt, iron, or a combination thereof, Cr is chromium, Al is aluminum and Y is yttrium. Given this description, one of ordinary skill in the art will recognize that other types of protective coatings 34 may also be used.

In the disclosed example, the protective coating 34 and the underlying nickel alloy of the blade 22 have different mechanical properties that are used to identify a location of an elevated stress region of the blade 22, such as a maximum stress region. For example, the protective coating 34 is brittle relative to the underlying nickel alloy of the blade 22. Thus, when a stress is applied to the blade 22, the protective coating 34 tends to crack at a lower stress than the underlying nickel alloy.

In the disclosed example, a stress is applied to the blade 22 to identify an elevated stress region of the blade 22. The type of stress that is used may depend on the type of stress that the blade 22 is subjected to in the engine 10 and the type of stress that may be subsequently applied in a repair process, such as bending stress, torque stress, etc.

In the disclosed example, the platform section 30 is held within a first fixture 36a that is secured on a support 38. The end of the airfoil section 32 is received within a second fixture 36b. The second fixture 36b may be adapted to receive a handle or other connection for applying a torque to the blade 22. The second fixture 36b, handle, or other connection may also include a measuring device, such as a known type of torque sensor, to determine a magnitude of the stress that is applied to the blade 22.

In one example, the second fixture 36b is rotated manually, as indicated by the rotational arrow, relative to the first fixture 36a to apply a torque stress to the blade 22. When the torque stress exceeds a ultimate strength of the protective coating 34, the protective coating 34 cracks. The ultimate strength of the protective coating 34 is less than a yield and ultimate strengths of the underlying nickel alloy of the turbine blade 22.

When the applied torque stress exceeds the ultimate strength of the protective coating 34, surface cracks 40 form in the protective coating 34. In the disclosed example, once the applied torque stress exceeds the ultimate strength of the protective coating 34, the stress is released such that the ultimate strength of the underlying nickel alloy is not exceeded. In some examples, the formation of the surface cracking 34 is audible and thereby provides an indication that the stress should be released.

The location of the surface cracks 40 on the blade 22 corresponds to a location of an elevated stress region 42 of the turbine blade 22. In one example, the elevated stress region 42 represents a maximum stress region, where the blade 22 experienced the greatest magnitude of stress from the torque applied to the second fixture 36b. If a measuring device is used with the second fixture 36b, the magnitude of the torque stress that caused the surface cracking 40 can be determined.

The location of the surface cracking 40, and hence the location of the elevated stress region 42, may be identified through the use of a dye penetrant such as a fluorescent dye. In other examples, the size of the surfacing cracking 40 may be visually discernable such that the dye is not required to identify the location.

In the disclosed example, the location of the elevated stress region 42 can be used to verify a predicted location of the elevated stress region 42. Referring to FIG. 3, a computer analysis, such as finite element analysis, is used to establish a predicted location 44 of the elevated stress region 42 of the blade 22. In some examples, the predicted location 44 may include contour lines that identify varying magnitudes of stress. For example, the finite element analysis may be based upon the geometry of the turbine blade 22, mechanical properties of the underlying nickel alloy and/or the protective coating 34, experimental data, or other inputs.

The surface cracking 40 represents the actual location of the elevated surface region 42. To verify that the predicted location 44 is accurate, the location of the surface cracking 40 is compared to the predicted location 44. For example, the comparison can take any suitable form, such as visual comparison or overlaying the finite element analysis result with the turbine blade 22. If the predicted location 44 aligns with the surface cracking 40, the predicted location 44 is accurate. However, if the predicted location 44 varies from the location of the surface cracking 40, the predicted location 44 may not be accurate. Thus, applying a stress to cause the surface cracking 40 on the turbine blade 22 provides the benefit of verifying the accuracy of the finite element analysis used to predict the location of the elevated surface stress region 42.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for use in repairing gas turbine engine components, comprising:
    a. applying a stress to a first gas turbine engine component to cause surface cracking on the first gas turbine engine component; and
    b. based upon a magnitude of the stress applied to the first gas turbine engine component that causes the surface cracking, establishing a maximum magnitude of a stress that is applied in a repair process to a second gas turbine engine component.

2. The method as recited in claim 1, wherein said step (a) includes applying a torque stress.

3. The method as recited in claim 1, wherein said step (a) includes applying a magnitude of the stress that is greater than a yield strength and less than an ultimate strength of the gas turbine engine component and greater than an ultimate strength of a protective coating on the gas turbine engine component.

4. The method as recited in claim 3, wherein the gas turbine engine component comprises a nickel alloy and the protective coating comprises aluminum.

5. The method as recited in claim 4, wherein the protective coating comprises a diffused aluminide coating.

6. The method as recited in claim 4, wherein the protective coating comprises MCrAlY, where the M includes at least one of nickel, cobalt, iron, or a combination thereof, Cr is chromium, Al is aluminum and Y is yttrium.

7. The method as recited in claim 1, wherein said step (a) includes applying the stress to cause the surface cracking in a protective coating on the first gas turbine engine component.

8. The method as recited in claim 1, wherein step (b) includes visually identifying the location of the surface cracking using a dye penetrant.

9. The method as recited in claim 1, wherein said step (a) includes holding a platform section of the first gas turbine engine component within a first fixture and holding an end of the first gas turbine engine component within a second fixture.

10. The method as recited in claim 1, wherein the first gas turbine engine component comprises a protective coating that includes aluminum, and the stress applied to the first gas turbine engine component causes the surface cracking in the protective coating.

* * * * *